United States Patent
Carey et al.

(10) Patent No.: US 10,841,364 B2
(45) Date of Patent: Nov. 17, 2020

(54) USING AND COMPARING KNOWN AND CURRENT ACTIVITY STATES TO DETERMINE RECEPTIVENESS

(71) Applicant: International Business Machines Corporation, Armonk, NY (US)

(72) Inventors: James E. Carey, Rochester, MN (US); Bradley L. Manning, Rochester, MN (US); Drew C. Varner, Rochester, MN (US); Charles J. Volzka, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 127 days.

(21) Appl. No.: 15/470,019

(22) Filed: Mar. 27, 2017

(65) Prior Publication Data
US 2018/0278502 A1 Sep. 27, 2018

(51) Int. Cl.
*H04L 12/26* (2006.01)
*H04L 29/08* (2006.01)

(52) U.S. Cl.
CPC .............. *H04L 67/10* (2013.01); *H04L 67/18* (2013.01); *H04L 67/20* (2013.01); *H04L 67/22* (2013.01); *H04L 67/306* (2013.01); *H04L 67/327* (2013.01)

(58) Field of Classification Search
CPC ............. H04L 65/1069; H04L 67/1069; H04L 67/124; H04L 67/303; H04L 67/306;
(Continued)

(56) References Cited

U.S. PATENT DOCUMENTS 5,983,147 A * 11/1999 Krumm .............. G06K 9/00362
701/45
7,444,379 B2 10/2008 Becker et al.
(Continued)

FOREIGN PATENT DOCUMENTS

WO 2011067675 A2 6/2011

OTHER PUBLICATIONS

Marshall, "Where is it? Locating connected devices," Future of Wireless, Cambridge, Jul. 2013, © u-blox AG,19 pages, http://www.cambridgewireless.co.uk/presentation/chrismarshall010713.pdf.
(Continued)

*Primary Examiner* — Lance Leonard Barry
(74) *Attorney, Agent, or Firm* — Peter Edwards

(57) ABSTRACT

A computer-implemented method may include identifying a sending computer system and a receiving computer system. The method may also include receiving a request from the sending computer system for a receptiveness value of the receiving computer system, where the receptiveness value indicates openness of the receiving computer system to interruption. The method may also include determining a current state of the receiving computer system. The method may also include determining a known state of the receiving computer system. The method may also include calculating a known state receptiveness value. The method may also include analyzing the current state and the known state to determine whether the current state is equivalent to the known state. The method may also include calculating the receptiveness value for the receiving computer system. The method may also include transmitting computer instructions for displaying the receptiveness value to the sending computer system.

14 Claims, 7 Drawing Sheets

(58) Field of Classification Search
CPC ....... H04L 67/327; H04L 67/10; H04L 67/22; H04L 67/18; H04L 67/20; H04L 43/0817; H04L 51/20; H04L 41/147
See application file for complete search history.

(56) References Cited

U.S. PATENT DOCUMENTS

| | | | |
|---|---|---|---|
| 7,739,210 B2* | 6/2010 | Horvitz | G06Q 10/109 706/21 |
| 8,082,302 B2 | 12/2011 | Becker et al. | |
| 8,484,339 B2 | 7/2013 | Klemm et al. | |
| 8,499,085 B2 | 7/2013 | Klemm et al. | |
| 8,924,326 B2 | 12/2014 | Arquette et al. | |
| 9,131,077 B2 | 9/2015 | Nishiyama | |
| 9,264,391 B2 | 2/2016 | Castera et al. | |
| 9,306,899 B1 | 4/2016 | Vendrow et al. | |
| 9,319,367 B2 | 4/2016 | Zeng et al. | |
| 2003/0014491 A1 | 1/2003 | Horvitz et al. | |
| 2004/0003042 A1* | 1/2004 | Horvitz | G06Q 10/109 709/204 |
| 2004/0249776 A1 | 12/2004 | Horvitz et al. | |
| 2008/0162632 A1 | 7/2008 | O'Sullivan et al. | |
| 2008/0319727 A1 | 12/2008 | Horvitz et al. | |
| 2009/0187650 A1 | 7/2009 | Cervantes et al. | |
| 2011/0044431 A1 | 2/2011 | Klemm | |
| 2012/0155288 A1 | 6/2012 | Kang et al. | |
| 2013/0072169 A1 | 3/2013 | Ross et al. | |
| 2014/0095016 A1* | 4/2014 | Suganuma | G07C 5/00 701/32.1 |
| 2014/0143165 A1 | 5/2014 | Posse et al. | |
| 2014/0358828 A1 | 12/2014 | Phillipps et al. | |
| 2015/0058273 A1 | 2/2015 | Coden et al. | |
| 2015/0163258 A1* | 6/2015 | Garcia, III | H04L 67/24 709/204 |
| 2015/0310020 A1 | 10/2015 | Brav et al. | |
| 2016/0019402 A1 | 1/2016 | Khandelwal | |
| 2016/0241496 A1 | 8/2016 | Cunico et al. | |
| 2016/0277570 A1 | 9/2016 | Marya et al. | |
| 2017/0316463 A1 | 11/2017 | Pielot et al. | |
| 2018/0153863 A1* | 6/2018 | Desai | A61K 47/42 |
| 2019/0253519 A1 | 8/2019 | Milosevic et al. | |

OTHER PUBLICATIONS

Mell et al., "The NIST Definition of Cloud Computing", Recommendations of the National Institute of Standards and Technology, NIST Special Publication 800-145, Sep. 2011, 7 pages.
Ranasinghe, et al., "Using Context-Awareness to Adapt Reminders for Building a Context-Aware Reminder," Int'l Journal of Computing, Communications & Instrumentation Engg. (IJCCIE), vol. 3, Issue 1, 2016, pp. 102-107, ISSN 2349-1469 EISSN 2349-1477.
Kucukyilmaz et al., "Chat Mining: Predicting User and Message Attributes in Computer-Mediated Communication," University Paper, printed on Jul. 8, 2016, 38 pages.
Unknown, "Engage With Rich Content, the Future of Enterprise Chat," [24]7 Chat Platform for Business | Enhanced Live Chat Support | [24]7, printed on Jul. 8, 2016, 5 pages http://www.247-inc.com/customer-engagement/247-chat.
Carey et al., "Determining Receptiveness to a New Communication," U.S. Appl. No. 15/283,529, filed Oct. 3, 2016.
List of IBM Patents or Patent Applications Treated as Related, Signed Mar. 24, 2017, 2 pages.
Unknown, "Evanescent Thoughts," Finding Invisible Friends and Dynamically Updating your Status in Google Chat Using XMPP Scripts, Printed on Mar. 27, 2017, 10 pages, https://sathyaphoenix.wordpress.com/2010/08/03/finding-invisible-friends-and-dynamically-updating-your-status-in-google-chat-using-xmpp-scripts-linux-python-ubuntu/.
List of IBM Patents or Patent Applications Treated as Related, Signed Feb. 13, 2018, 2 pages.
Carey et al., "Using Activity States to Determine Receptiveness," U.S. Appl. No. 15/899,875, filed Feb. 20, 2018.
"Accelerated Examination Support Document," International Business Machines Corporation, Dated Feb. 13, 2018, 42 pages.

* cited by examiner

USING AND COMPARING KNOWN AND CURRENT ACTIVITY STATES TO DETERMINE RECEPTIVENESS

BACKGROUND

The present disclosure relates to communication, and more specifically to using activity states of a computer system and the surrounding area to determine receptiveness to an electronic communication.

SUMMARY

The present invention provides a computer implemented method, a system, and a computer program product to determine receptiveness to an electronic communication. The method may include identifying a sending computer system and a receiving computer system, where the sending computer system is a potential sender of at least one electronic message during a first time period and where the receiving computer system is a potential recipient of the at least one electronic message during the first time period. The method may also include receiving a request from the sending computer system for a receptiveness value of the receiving computer system, where the receptiveness value indicates openness of the receiving computer system to interruption. The method may also include determining a current state of the receiving computer system, where the current state is a state of activity of one or more external devices in a geographic area of the receiving computer system during the first time period. The method may also include determining a known state of the receiving computer system, where the known state is the state of activity of the one or more external devices in the geographic area of the receiving computer system during a second time period, where the second time period precedes the first time period. The method may also include analyzing the current state and the known state to determine whether the current state is equivalent to the known state. The method may also include, in response to analyzing the current state and the known state, calculating the receptiveness value for the receiving computer system. The method may also include transmitting computer instructions for displaying the receptiveness value to the sending computer system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
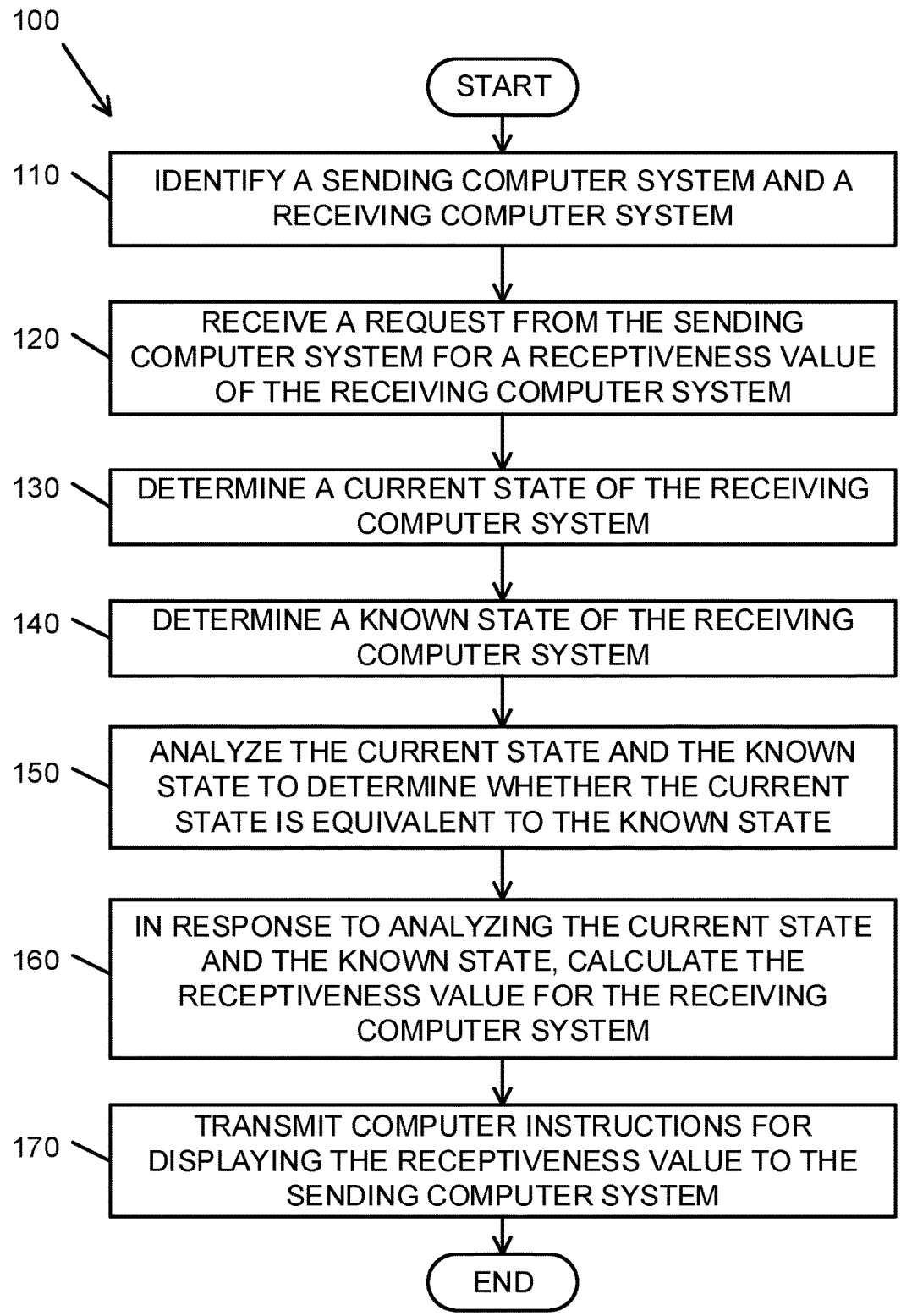
FIG. 1 presents a flowchart, according to various embodiments.

While the invention is amenable to various embodiments an alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The present disclosure relates to electronic communication, and more specifically to using activity states of a computer system and the surrounding area to determine receptiveness to an electronic communication. While the present disclosure is not necessarily limited to such applications, various aspects of the disclosure may be appreciated through a discussion of various examples using this context.

The present invention provides a computer implemented method, a system, and a computer program product to determine receptiveness to a communication. Aspects of the present disclosure are directed toward determining a numerical value, herein a receptiveness value, to represent the openness of a receiver (a user who is a potential recipient of a communication) and the openness of a computer system of the receiver, herein a receiving computer system, to an electronic communication. Openness may refer to a user's willingness to be interrupted. For example, if a user is actively working on a project, the user may not want to be interrupted. Openness may also refer to the likeliness of the receiver viewing the communication. For example, if a user (receiver) is not very active on the receiving computer system, the receiver may not immediately see, or view, the communication displayed on the receiving computer system.

In various embodiments, the receptiveness value indicates the openness/receptiveness of the receiving computer system and the openness/receptiveness of the corresponding receiver to interruption at a current time. The receptiveness may indicate the likeliness of an action being taken by the receiver/receiving computer system once the electronic communication has been received. For example, if the receiver/receiving computer system were to receive a message asking for a favor, the receiver/receiving computer system may send a response electronic communication, take action in regards to the favor, or perhaps do nothing. In various embodiments the receptiveness value is a number, where a high number indicates high receptiveness and a low number indicates low receptiveness (e.g., a value between 1 and 10), or vice versa. For example, if the present invention were to determine that the receptiveness value of the receiving computer system is 3, on a scale of 1 to 10, the receptiveness value may indicate to the sending computer system and the corresponding sender that the receiver is not very likely to respond or take action in response to receiving an electronic communication. In various embodiments, the receptiveness value is a percentage. A high percentage may indicate a high receptiveness and a low percentage may indicate a low receptiveness, or vice versa. For example, the receptiveness value may be 90%, indicating that the receiver is very likely to respond or take action in response to receiving an electronic communication.

The receptiveness value may be displayed to a sender (a user who is a potential sender of an electronic communication) via a computer system associated with the sender, herein a sending computer system, who may then decide whether or not to initiate contact based on the current openness of the receiving computer system to an interruption. In various embodiments, the receptiveness value is displayed via the sending computer system before the sending computer system sends an electronic communication to the receiving computer system. For example, the receptiveness value may be displayed on a contact list of the sender via an electronic communication system (e.g., electronic mail (email), instant messaging, social media messaging, text messaging). In another example, the receptiveness value may be displayed in response to the sender selects a potential receiver/receiving computer system. In various embodiments, the sending computer system requests the receptiveness value from the receiving computer system. The sender and the sending computer system may have to manually request to receive and view the receptiveness value. In various embodiments, the receptiveness value is automatically sent to the sending computer system.

In various embodiments, a sending computer system sends an electronic communication to a receiving computer system. In other various embodiments, a sending computer system does not send the electronic communication, or message, to the receiving computer system. For instance, a sending computer system may determine, after reviewing a receptiveness value of the receiving computer system, to send an electronic communication to the receiving computer system. In other instances, a sending computer system may determine, after reviewing a receptiveness value of the receiving computer system, to decline sending an electronic communication to the receiving computer system.

According to various embodiments, the receptiveness value may be a general value or may be specific to each sending computer system. A general receptiveness value may be the same for all sending computer systems. The receiving computer system may transmit the same receptiveness value to any and all sending computer systems. For example, if a receiving computer system were to have a receptiveness value of 0.7, the receptiveness value of 0.7 would be displayed for each sender on the sending computer systems. In various embodiments, a specific receptiveness value may be evaluated individually for each sending computer system. For example, if the sender were working on a project with the receiver such that the receiver would be more available for that specific sender than with other senders, a specific receptiveness value would be assigned and displayed to the specific sender. Specifically, for example, the receiver may have a receptiveness value of 10 displayed to the specific sender, but any other sender and sending computer system may have a receptiveness value of 3 displayed.

In order to determine the receptiveness value, in an embodiment, the present invention considers activity states of the receiving computer system as well as activity states of any nearby electronic devices. In various embodiments, activity states indicate the level of activity or liveliness of the receiving computer system and/or of the nearby electronic devices. In various embodiments, the activity state for the receiving computer system and/or for the nearby electronic devices is a general activity state for the overall computer system/electronic device. For example, an activity state of a computer system/electronic device may simply be that the computer system/electronic device is on, or active. In various embodiments, each task and application within the electronic device/computer system has a unique activity state. For example, the computer system may include activity states indicating that a web browser is open or active, and an email server is open or active. Activity states may simply indicate whether an electronic device, a computer software task, and/or computer software application is on or off. In various embodiments, activity states of an electronic device/computer system include detail on the activity of the device, the computer software task, and/or the computer software application. For example, an activity state of a coffee pot may include that the coffee pot is on, the water is heating, and/or the coffee is brewing. In another example, the activity state of a television (TV) may include the specific show or event being watched on the TV.

The receiver/receiving computer system may be more or less receptive, or open to interruption, depending on the activity of external devices. For example, if a television (TV) were on, the receiver/receiving computer system may be less receptive/open to interruption than if the TV were off. Specifically, for example, if the TV were on, the primary focus of the receiver may be on the TV and the receiver may not view or respond to an electronic communication, such that the receiver would be less receptive/open to interruption. Further, for example, the receiver may be more receptive if the news were playing on the TV and may be less receptive if a sports game were playing on the TV. In various embodiments, the present invention uses both a known state and a current state of the receiving computer system help determine the receptiveness value of the receiving computer system. The known state may be an activity state of the receiving computer system during a past time. The current state may be an activity state of the receiving computer system during a current time. In various embodiments, the current state and the known state are analyzed, or correlated, to help determine the receptiveness value.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and personal digital assistants (PDAs)).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources by may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring to FIG. 1, a flowchart illustrating a method 100 for determining a receptiveness value is depicted, according to various embodiments. In an embodiment, the method 100 is implemented as a computer script or computer program to be executed on a computer system such as computer system 700. In an embodiment, a computer system is configured to execute operation 110 to identify a sending computer system and a receiving computer system. In various embodiments, the sending computer system is a potential sender of at least one electronic message during a first time period. In various embodiments, the receiving computer system is a potential recipient of the at least one electronic message during the first time period. In an embodiment, identifying the sending computer system and receiving computer system includes locating the sending computer system and the receiving computer system and establishing a logical connection between the sending computer system and the receiving computer system. In various embodiments, the connection is via a network. In an embodiment, the connection is via cloud computing. In various embodiments, locating the sending computer system and the receiving computer system includes identifying the network address for each of the computer systems.

In an embodiment, the computer system is configured to execute operation 120 to receive a request from the sending computer system for a receptiveness value of the receiving computer system. In various embodiments, as discussed herein, the receptiveness value indicates openness of the receiving computer system to interruption. In various embodiments, a request from the sending computer system is an automatic update. The automatic update may occur at certain times. For example, the receptiveness value may be automatically updated every 15 minutes. In various embodiments, a request from the sending computer system is a manual request from the sender. For example, a user of a sending computer system may want to send an electronic message to a manager, but manually requests for the receptiveness value to be updated in order to ensure that the manager is receptive to an electronic communication.

In an embodiment, a computer system is configured to execute operation 130 to determine a current state of the receiving computer system. In various embodiments, the current state is a state of activity of one or more external devices in a geographic area of the receiving computer system during the first time period. In various embodiments, the first time period is the current time period. The geographic area may be a room in which the receiving computer system is located. In various embodiments, the geographic area is a distance surrounding the receiving computer system. For example, the technology used to monitor the external devices may be effective within a certain range. In various embodiments, this certain range may be the geographic area.

In an embodiment, determining the current state comprises locating the one or more external devices in the geographic area of the receiving computer system during the first time period, identifying activity states of the one or more external devices during the first time period, and analyzing the activity states of the one or more external devices during the first time period, resulting in the current state. In various embodiments, the external devices are located using the internet of things (IoT). In various embodiments, the external devices are located using Bluetooth® or personal area network (PAN) technology. Examples of the locating using IoT are described herein. In various embodiments, location is used to identify and then analyze the external devices. In an embodiment, the external devices may provide their GPS location. In various embodiments, the location may be assigned to an external device when an external device is setup or installed. In an embodiment, various signals are used to determine location. For example, when using the IoT, global navigation satellite system (GNSS) (e.g., Global Positioning System (GPS), Global Navigation Satellite System (GLONASS), Europe's Global Satellite Navigation System named Galileo, BeiDou Navigation Satellite System (BDS), cellular (e.g., Global System for Mobile Communications (GSM®), Long-Term Evolution (LTE®), and/or local beacon (e.g., wireless internet) signals may be used to determine location. In various embodiments, the location of the device is used to identify the device and to track the device. In order to identify the device, an external device identifier may be transmitted along with the GPS location. In various embodiments, the location of the device is used to gather data of the device.

In various embodiments, identifying activity states of the one or more external devices during the first time period includes determining current activities of the external devices, wherein current activities are the actions or activities of the one or more devices during the current time. For example, if the receiving computer system were within a geographic area of a TV, a video game console, a coffee pot, a microwave, and/or a light switch, identifying activity states of the devices may include identifying that the TV is on, the video game console is off, the coffee pot is on and brewing, the microwave is off, and/or the light switch is on. In another example, if the receiving computer system were within a geographic area (e.g., within twenty feet) of a mobile device, identifying activity states may include identifying that a certain computer software application or web browser is active on the mobile device (e.g., a game may be active on the device).

In various embodiments, analyzing the activity states of the one or more external devices during the first time period includes gathering data of the activity states of the external devices and determining an overall state of the devices during the first time period. The various activity states of the external devices may be compiled. In various embodiments, an overall state of the devices may be a compiled list or chart of the activities of the external devices. In various embodiments, an overall state of the devices is a singular state that summarizes the various activities and states of the external devices. For example, if a TV were on, a video game console were off, a coffee pot were on and brewing, a microwave were off, and/or a light switch were on, the overall state may be moderately active. In another example, if a mobile device were on and active (e.g., an application is actively running), the overall state may be active.

In various embodiments, determining the current state further includes calculating a current state receptiveness value. In an embodiment, the current state receptiveness value indicates the openness of the receiving computer system to interruption at the current state. In various embodiments, the overall state may correspond with a receptiveness value. For example, a moderately active state may have a receptiveness value of 0.5 or a range of receptiveness values from 0.5-0.7, on a scale of 0 to 1. In various embodiments, calculating the current state receptiveness value is done using an automated statistical technique, described herein.

In an embodiment, a computer system is configured to execute operation 140 to determine a known state of the receiving computer system. In various embodiments, the known state is the state of activity of the one or more external devices in the geographic area of the receiving computer system during a second time period. In an embodiment, the second time period precedes the first time period. For example, the first time period may be the current time and the second time period may have been a week prior to the current time.

In various embodiments, determining the known state comprises locating the one or more external devices in the geographic are of the receiving computer system during the second time period, identifying the activity states of the one or more external devices during the second time period, and analyzing the activity states of the one or more external devices during the second time period. In various embodiments, the external devices are located using IoT. In various embodiments, location is used to find and analyze the external devices. In various embodiments, the activity and activity states of the external devices are stored in a memory database and are accessed during the first time period by the receiving computer system. In various embodiments, the memory database is stored in a memory of the receiving computer system. In various embodiments, the memory database is within a memory of a third party system.

In various embodiments, identifying the activity states of the one or more external devices during the second time period includes determining activities of the external devices during the second time period. For example, the activity states may include a light switch is off, a TV is off, and/or a mobile device is on. In an embodiment, analyzing the activity states of the one or more external devices during the second time period includes gathering data of the activity states of the one or more external devices and determining an overall state of the one or more external devices during the second time period. In various embodiments, the activity state data is gathered during the second time period and saved. In various embodiments, the data is saved on the receiving computer system. In various embodiments, the data is saved on a third party server.

In various embodiments, determining the known state further includes calculating a known state receptiveness value. In an embodiment, the known state receptiveness value indicates the openness of the receiver to interruption and the openness of the corresponding receiving computer system to interruption, at the known state. In various embodiments, calculating the known state receptiveness value includes identifying at least one second time period electronic message received by the receiving computer system during the second time period, identifying message metadata for the at least one second time period electronic message, calculating a response time to the at least one second time period electronic message, in response to calculating the response time, generating correlation transaction sets and the correlation probabilities, and calculating the known state receptiveness value using the correlation transaction sets and probabilities. In various embodiments, the response time is an elapsed time between a time the receiving computer system receives the at least one second time period electronic message and a time the receiving computer system sends a response to the at least one second time period electronic message. In an embodiment, each of the correlation transaction sets is a data set of the one or more external devices, the activity states, and the response time. In various embodiments, each of the correlation probabilities is a probability of the one or more external devices and the activity states correlating with the response time based on the correlation transaction sets.

In various embodiments, identifying at least one second time period electronic message received by the receiving computer system during the second time period includes identifying a past electronic message received by the receiving computer system. For example, the receiving computer system may have received an instant message from a specific sending computer system three days before the current time. In an embodiment, identifying message metadata for the at least one second time period electronic message includes locating and finding data gathered from past messages. In an embodiment, this data is stored within a memory of the receiving computer system. In an embodiment, the data is stored within a memory of a third party system. In various embodiments, the message metadata may include the time the second time period electronic message was sent or received, the sender of the second time period electronic message, the length of the second time period electronic message, the known state of the receiving computer system at the second time period or the time the second time period electronic message was sent/received, the activity states of the external devices at the second time period, and/or the activity states of the receiving computer system at the second time period.

In an embodiment, calculating a response time to the second time period electronic message includes determining a time the second time period electronic message was received by the receiving computer system and determining a time a response message was sent by the receiving computer system. These times may be included in the data gathered from the past messages. In various embodiments, the response time is the time between the time the second time period electronic message was received and the time the response message was sent. In an embodiment, calculating the response time may include calculating the difference between the time the second time period electronic message was received and the time the response message was sent. In various embodiments, the response message includes an answer or action taken in response to the second time period electronic message. For example, if a second time period electronic message from the sending computer system to the receiving computer system were "what time is our meeting this afternoon?" and the response message from the receiving computer system were "2:00", a message sent by the receiving computer system of "we'll talk later" in response to the second time period electronic message may not be classified as a response message because the message does not include an action or answer in response to the second time period electronic message.

In various embodiments, generating correlation transaction sets and correlation probabilities includes identifying data sets for the external devices, the activity states of the external devices, and the response time corresponding to the activity states of the external devices. In an embodiment, the correlation probability identifies how much the external devices and their states correlate with the response time, based on the correlation transaction sets. For example, at a known state, if a light switch were on, a TV were off, a gaming console were off, and a coffee pot were off, based on the activity states of the external devices (with minimal devices that are on or active), the receiving computer system may be predicted to have a high receptiveness to interruption. A response time of the receiving computer system being 2 hours may indicate a low receptiveness. Because this low receptiveness was not expected based on the activity states of the external devices, the correlation probability in this example would be low (for example 30%), because the response time does not correlate with the activity states and the correlation transaction set. In various embodiments, the known state receptiveness value is calculated using the correlation transaction sets and probabilities via an automated statistical technique described herein.

In an embodiment, a computer system is configured to execute operation 150 to analyze the current state and the known state to determine whether the current state is equivalent to the known state. In various embodiments, analyzing the current state and the known state includes identifying a known state that is most closely related to the current state. Identifying a known state that is closely related to the current state may increase the accuracy of the receptiveness value. For example, if the current state and the known state were to have the same activity states of external devices (e.g., TV on and light switch on) then the receptiveness of the receiving computer system to interruption for the known state may be similar or the same as the receptiveness of the receiving computer system to interruption for the current state. In various embodiments, analyzing the current state and the known state includes comparing the current state to the known state.

In an embodiment, calculating the receptiveness value includes, in response to determining that the current state is unequal to the known state, calculating the receptiveness value via an automated statistical technique.

In an embodiment, calculating the receptiveness value comprises, in response to determining that the current state is equivalent to the known state, determining the receptiveness value for the receiving computer system is equivalent to the calculated known state receptiveness value. For example, if the TV were on and external lights were on (with all other external devices either off or inactive) for both the known state and the current state, and the receptiveness value were calculated to be 0.3 for the known state, the receptiveness value may also be 0.3 for the current state.

In an embodiment, a computer system is configured to execute operation 160 to calculate the receptiveness value for the receiving computer system in response to analyzing the current state and the known state. In various embodiments, the calculating includes determining that the receptiveness value for the receiving computer system is equivalent to the known state receptiveness value.

In various embodiments, the calculating is done using an automated statistical technique. In various embodiments, the automated statistical technique is implemented as a computer script or computer program to be executed on a computer system such as computer system 700. In various embodiments, the automated statistical technique is executed via a cloud computing system.

In an embodiment, via the automated statistical technique, a computer system is configured to correlate data of the receiving computer system and the external devices. For example, a list of all activity states of the receiving computer system and the external devices may be gathered. In various embodiments, correlating data of the receiving computer system and the external devices includes cleaning up and condensing the data.

In an embodiment, via the automated statistical technique, a computer system is configured to determine an effect value for each activity state. In various embodiments, the effect value indicates the importance, or effect, of the activity state on the receptiveness of the receiving computer system to interruption. In various embodiments, each activity state is assigned a unique effect value. For example, a coffee pot being turned on may be assigned an effect value of 1, while a gaming system being turned on may be assigned an effect value of 10. In an embodiment, the effect value is predetermined by the receiving computer system. In various embodiments, the effect value is predetermined by a third party system. In an embodiment, the effect value is calculated using previous known states and known state receptiveness values.

In an embodiment, a computer system is configured to store the effect value in a coefficient variable for each activity state. In various embodiments, the effect value is a coefficient of the corresponding activity state. For example, an application "Notepad" currently active on an external computer, with a calculated effect value of 11, would read "11 Notepad" where 11 is the coefficient corresponding to "Notepad." In various embodiments, these effect value coefficients and activity states are inserted into a table.

In an embodiment, a computer system is configured to calculate, using the stored effect values, the receptiveness value for the receiving computer system. In various embodiments, this calculation is done using the automated statistical technique. In various embodiments, the statistical technique includes combining the tabulated effect value coefficients to determine a total effect value, and allocating total effect values (or a range of total effect values) with receptiveness values. For example, a table of effect value coefficients may read:

11 "Notepad"
1 Mozilla® Firefox®
1 Microsoft Windows® Command Processor (Command Prompt)
10 Microsoft® Visual Studio® Debugger In this example, these coefficients may be added together to get a total effect value of 23. A range of total effect values from 20-30 may be assigned to a receptiveness value indicating that the receiver is moderately available (e.g., a receptiveness value of 3 from a scale of 1 to 10). In various embodiments, positive and negative values may be used to indicate varying degrees of receptiveness.

In an embodiment, a computer system is configured to execute operation 170 to transmit computer instructions for displaying the receptiveness value to the sending computer system. In various embodiments, transmitting computer instructions for displaying the receptiveness value includes sending the receptiveness value to the sending computer system. The sending computer system may display the receptiveness value. Many types of electronic communication, for example instant messaging, include a status for the user. This status, herein traditional status, may inform other users about the current availability of the or the activity of the user and may be commonly represented by a general status such as "available", "away", a statement of current activity, or simply by a color (e.g., green, yellow, red). In various embodiments, the transmitted instructions may display the receptiveness value in addition to a traditional status. For example, a receiver may have a traditional status indicating availability but a receptiveness value indicating that the receiver is not open to interruption. In another example, a receiver and receiving computer system may have a traditional status indicating that the receiver is on the phone, but still may have a high receptiveness value because historically the receiver has been positively responsive to communications during similar calls. In various embodiments, the instructions to display the receptiveness value are transmitted in a way to protect the privacy of the receiving computer system and the receiver. In various embodiments, the transmitted instructions display the receptiveness value in a user friendly manner. A user friendly manner may include color, shapes, scales, descriptive words, or other visually appealing formatting.

In various embodiments, the receiving computer system is configured to receive the receptiveness value from the receiver. A receiver may be able to manually input a receptiveness value, which may then be received by the receiving computer system. A receptiveness value may be transmitted as a general value, or a value specific to a sending computer system or group of sending computer systems. In various embodiments, a general receptiveness value may be a value that is attributed to all sending computer systems.

In various embodiments, when a receptiveness value is specific to a sending computer system or group of sending computer systems, a computer system is further configured to identify electronic communication exchanged between the receiving computer system and at least one sending computer system based on a review of historical data. For example, a user may have a short response time when communicating with a manager. In response to reviewing historical data in terms of the specific sending computer system(s), a second receptiveness value may be calculated for the specific sending computer system(s), in various embodiments. Instructions for displaying the second receptiveness value may then be transmitted to the specific sending computer system(s).

In an embodiment, based on the calculated receptiveness value, the receiving computer system executes a preventative action. When the receiver and the receiving computer system are not open to interruption, the receiving computer system may take action to stop an electronic communication from being displayed to the receiver/receiving computer system. In various embodiments, preventative action may include blocking incoming electronic communication from a sending computer system, storing electronic communication until the receptiveness value drops below or above a threshold and then displaying the electronic communication to the receiver/receiving computer system, or another preventative action that stops the display of the electronic communication to the receiver/receiving computer system.

In various embodiments, operations 110, 120, 150, 160, and 170 of method 100 may all be performed by the receiving computer system. Performing operation 110, 120, 150, 160, and 170 by the receiving computer system may preserve the privacy of the receiving computer system as potentially private data may not be sent to the sending computer system. In these embodiments, the receptiveness value may be the only information sent to the sending computer system(s).

In various embodiments, operations 110, 120, 150, 160, and 170 of method 100 may all be performed by a computer system of a trusted third party. In various embodiments, a third party computer system is involved to factor in additional information. Additional information may include metrics such as the job title, work hours, and/or other information of the receiver that may not be available to the receiving computer system. For example, a receiving computer system may not have access to the vacation schedule of the receiver, but a third party may be able to obtain permission to access such information. Third party processing may also allow for meta-analysis of many receivers to identify additional patterns, such as programmers not favoring interruptions while development applications are open, managers being less open to interruption during meetings, and subordinates being available to electronic communication from a direct manager.

In various embodiments, use of a third party computer system may help protect the privacy of a receiver from potential senders and sending computer systems. Without a third party server, the receiver may need to broadcast the receptiveness value for each sender. For example, if an employee were consistently more open to electronic communication with one co-worker over another, not using a third party server may lead to inadvertently leaking the relative openness/receptiveness to interruption of a receiver to one individual (sender) over another. Using a third party server may allow the receiver/receiving computer system to inform the server about all receptiveness values of a potential sender, but a specific sender may only be able to query the server for its specific receptiveness value.

In various embodiments, a computer system is further configured to receive feedback data relating to accuracy of the receptiveness value. The receiver may have an option to input feedback indicating the accuracy of their calculated receptiveness value. For example, a receiver may have a receptiveness value indicating high receptiveness but is actually very busy reading a document and is not receptive to communication. The receiver may give feedback indicating that the receptiveness value was not accurate. Feedback may include surveys, ratings, or other methods of indicating accuracy. In various embodiments, a sender, and the corresponding sending computer system, has the option to input feedback.

In various embodiments where feedback is inputted, feedback data may be used to calculate a value indicating the accuracy of the receptiveness value (accuracy value). In various embodiments, an accuracy value indicating low accuracy is used to adjust the automated statistical technique used to calculate the receptiveness value. For example, feedback may indicate that the receptiveness value is not accurate therefore the calculation may be adjusted to help increase accuracy for future receptiveness value calculations.

Figure 2:
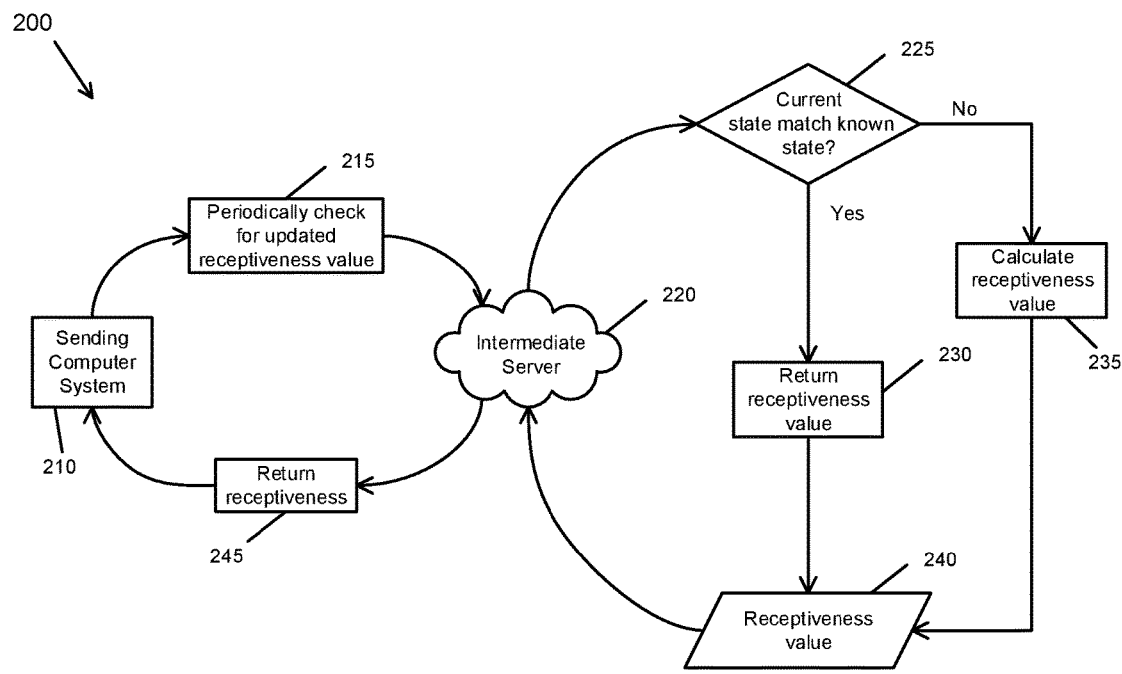
FIG. 2 presents a state diagram, according to various embodiments.

Referring to FIG. 2, a state diagram 200 depicts interactions between different steps of determining the receptiveness value, according to various embodiments. In various embodiments, a sending computer system 210 executes operation 215 periodically checking for an updated receptiveness value. In an embodiment, in order to execute operation 215, the sending computer system 210 contacts the intermediate server 220. In various embodiments, the intermediate server 220 is a third party server. In other various embodiments, the intermediate server 220 is a server on the receiving computer system. In other various embodiments, the intermediate server 220 is a server logically coupled to the receiving computer system. In order to determine the receptiveness value, intermediate server 220 may execute operation 225 determining whether the current state matches the known state. In an embodiment, intermediate server 220 executes operation 225 via operation 150. In various embodiments, if intermediate server determines that the current state does not match the known state when executing operation 225, the present invention performs operation 235 calculating the receptiveness value. In an embodiment, the present invention executes operation 235 via operation 160. In various embodiments, if it is determined that the current state matches the known state such that the receptiveness value of the current state is the same as or substantially similar to the receptiveness value of the known state, the present invention executes operation 230 returning the receptiveness value. In an embodiment, in response to executing operation 230, 235, present invention executes operation 240 sending the receptiveness value to the intermediate server 220. The intermediate server 220 may execute operation 245 returning the receptiveness value to the sending computer system 210.

Figure 3:
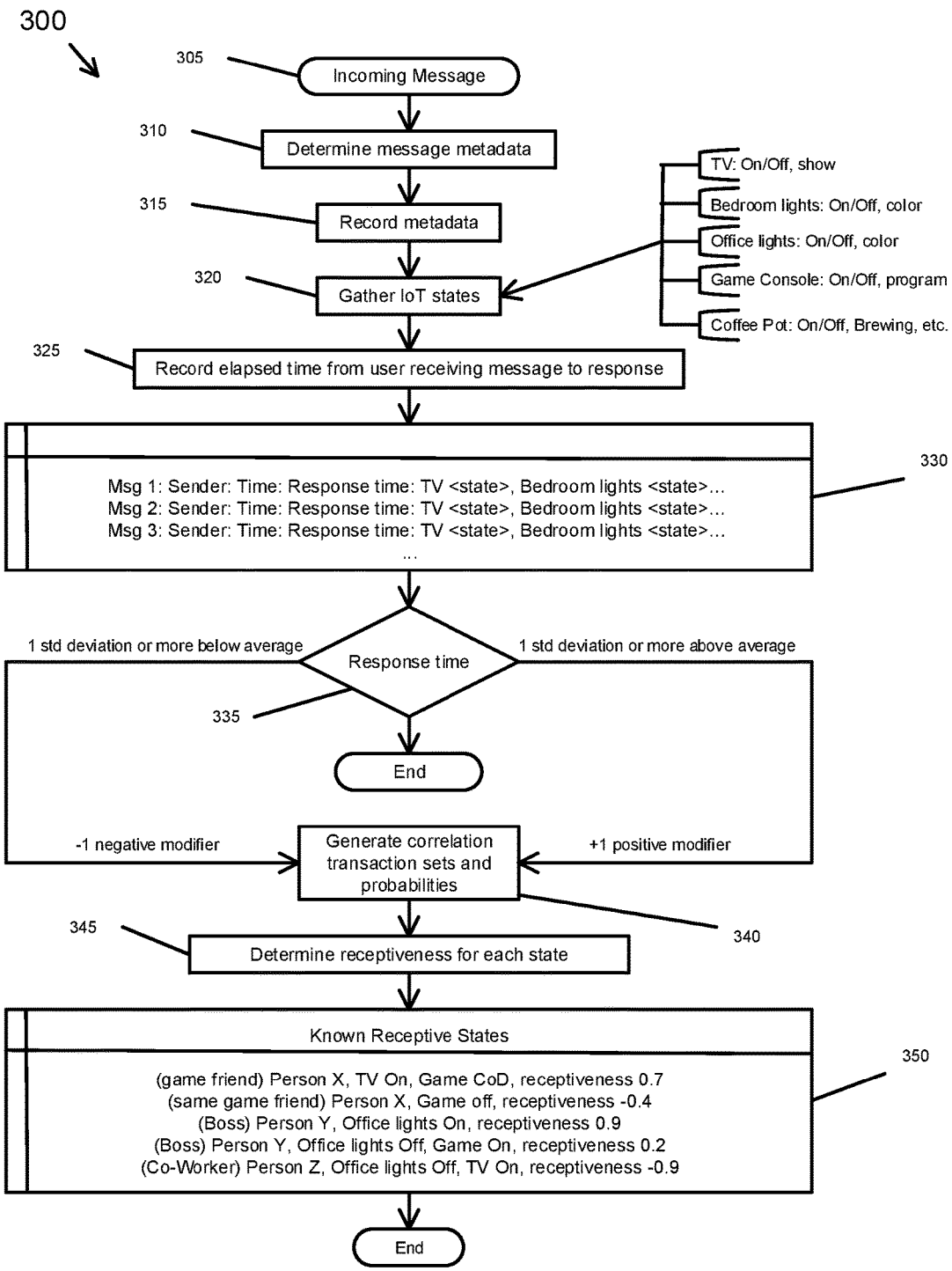
FIG. 3 presents a flowchart, according to various embodiments.

Referring to FIG. 3, a flowchart outlining a method 300 of determining and updating known states is depicted, according to various embodiments. In various embodiments, method 300 occurs during a second time period, wherein the second time period precedes the current time period. In an embodiment, a computer system is configured to execute operation 305 identifying or receiving an incoming message. In an embodiment, a computer system is configured to execute operation 310 determining message metadata. In an embodiment, a computer system is configured to execute operation 315 recording the message metadata (e.g., sender, time, relationship). The recorded message metadata may be saved for further analysis at a later time (e.g., the first time period). The recorded message metadata may be further analyzed during the second time period.

In various embodiments, a computer system is configured to execute operation 320 gathering IoT states, such as "TV: On/Off, show", "Bedroom lights: On/Off, color", "Office lights: On/Off, color", "Game Console: On/Off, program", and "Coffee Pot: On/Off, Brewing". In various embodiments, the IoT states are the same as the activity states described in method 100. In various embodiments, a computer system executes operation 325 recording an elapsed time from a user/receiving computer system receiving a message to the response. In an embodiment, this elapsed time is the response time. In various embodiments, operation 330 depicts/displays the recorded metadata gathered in operations 310-325.

In an embodiment, a computer system executes operation 335 analyzing the response time. This analysis may include determining whether the response time is one or more standard deviations above or below the average response time. In an embodiment, the response time is less than one standard deviation above or below the average response time and method 300 concludes. In various embodiments, this analysis further includes determining that the response time is one or more standard deviations above the average and assigning a +1 positive modifier to the data. In various embodiments, this analysis further includes determining that the response time is one or more standard deviations below the average response time and assigning a −1 negative modifier to the data.

In various embodiments, once the modifier is assigned, the computer system executes operation 340 generating correlation transaction sets and probabilities is executed. In various embodiments, the computer system executes operation 345 determining receptiveness for each state using the correlation transaction sets and probabilities and the modifier. In various embodiments, the receptiveness for each state is the same as the known state receptiveness value. In various embodiments, a positive or negative modifier corresponds with a positive or negative receptiveness. For example, a positive modifier may indicate that the receptiveness value is positive, which may indicate that a user is more open to interruption. In various embodiments, determining the known state receptiveness value includes operation 140. In an embodiment, the computer system executes operation 350 records known receptive states, or the known state receptiveness values.

Figure 4:
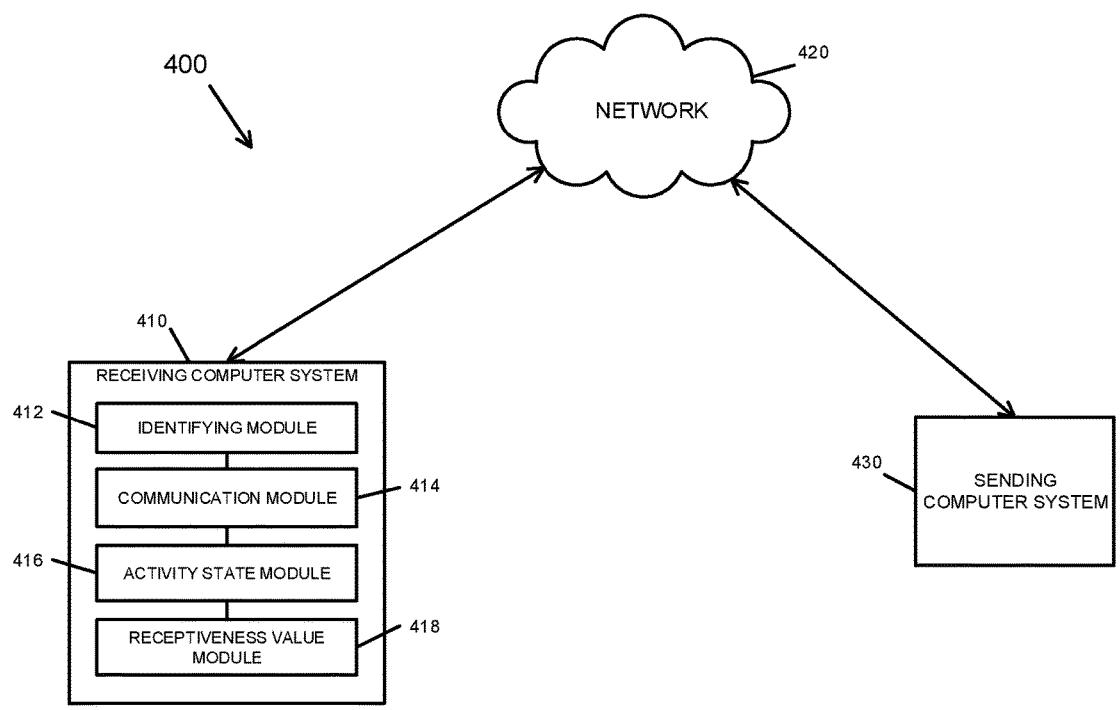
FIG. 4 depicts a schematic diagram outlining a computer system, according to various embodiments.

Referring to FIG. 4, system 400 includes computer systems and connections for determining a receptiveness value, according to various embodiments. System 400 is only one possible arrangement of connecting computer systems.

In various embodiments, system 400 includes a receiving computer system 410, a network 420, and a sending computer system 430. Although system 400 depicts one receiving computer system 410 and one sending computer system 430, any number or receiving computer systems 410 and sending computer systems 430 may be logically coupled to each other. In various embodiments, network 420 logically couples receiving computer system 410 to sending computer system 430. In various embodiments, receiving computer system 410 and sending computer system 430 are logically coupled via a cloud computing system.

In various embodiments, receiving computer system 410 includes an identifying module 412, a communication module 414, an activity state module 416, and a receptiveness value module 418. Although the receiving computer system 410 is depicted herein with certain elements and implementations, the receiving computer system 410 is not limited to these elements and implementations. In various embodiments, the identifying module 412 identifies a sending computer system 430 and a receiving computer system 410. In various embodiments, the communication module 414 receives a request from the sending computer system 430 for a receptiveness value of the receiving computer system. In various embodiments, the activity state module 416 determines a current state of the receiving computer system 410. The activity state module 416 may also determine a known state of the receiving computer system 410. In various embodiments, the activity state module 416 analyzes the current state and the known state to determine whether the current state is equivalent to the known state. In various embodiments, the receptiveness value module 418 calculates the receptiveness value for the receiving computer system 410. The receptiveness value module 418 may also to transmit computer instructions for displaying the receptiveness value to the sending computer system 430.

Figure 5:
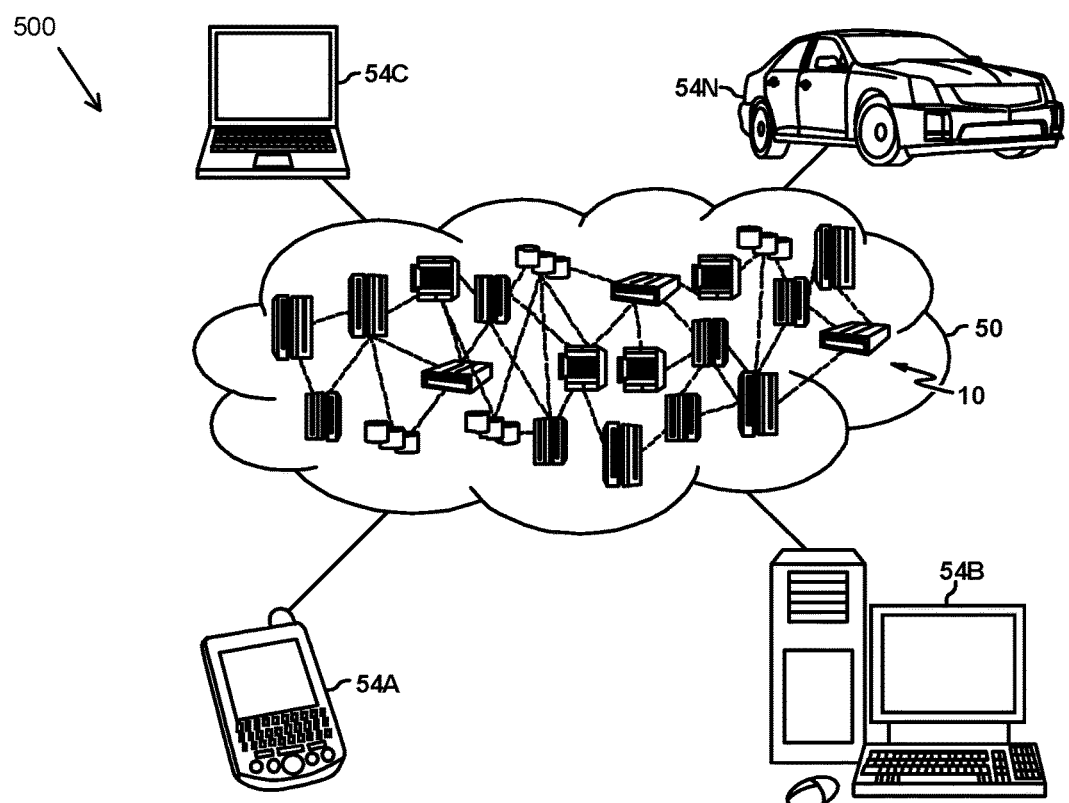
FIG. 5 depicts a cloud computing environment, according to various embodiments.

Referring to FIG. 5, an illustrative cloud computing environment 500 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
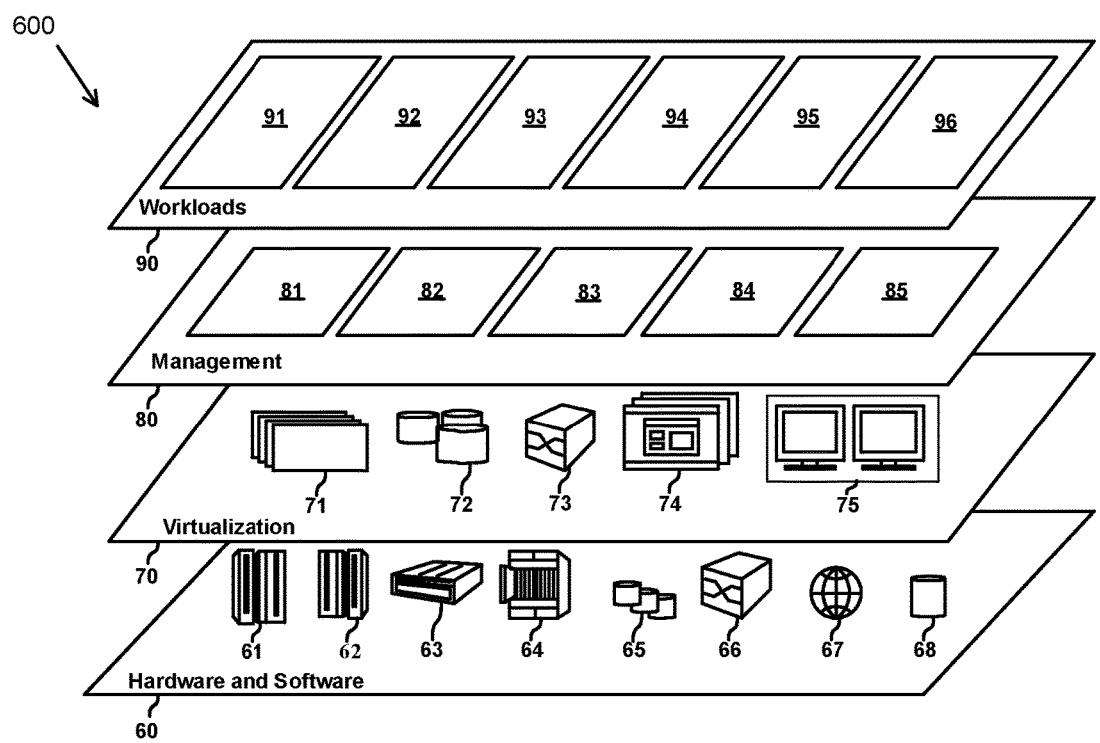
FIG. 6 depicts abstraction model layers, according to various embodiments.

Referring to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and communication processing 96.

Figure 7:
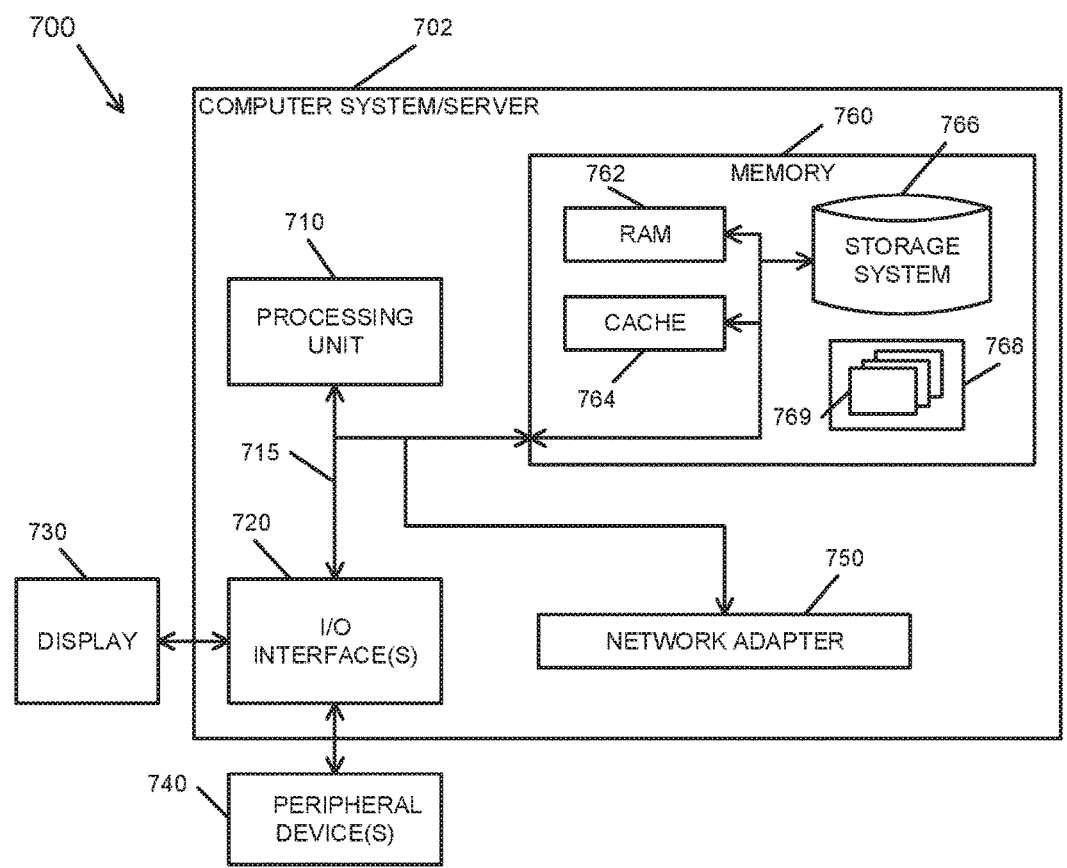
FIG. 7 depicts a sample computer system, according to various embodiments.

Referring to FIG. 7, an exemplary embodiment of a computer system, computer system 700, is depicted. Computer system 700 is only one example of a computer system and is not intended to suggest any limitation as to the scope of use or functionality of embodiments of the present invention. Regardless, computer system 700 is capable of being implemented to perform and/or performing any of the functionality/operations of the present invention.

Computer system 700 includes a computer system/server 702, which is operational with numerous other general purpose or special purpose computing system environments or configurations. Examples of well-known computing systems, environments, and/or configurations that may be suitable for use with computer system/server 702 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 702 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 702 in cloud computing node 700 is shown in the form of a general-purpose computing device. The components of computer system/server 702 may include, but are not limited to, one or more processors or processing units 710, a system memory 760, and a bus 715 that couple various system components including system memory 760 to processor 710.

Bus 715 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 760 can include computer system readable media in the form of volatile memory, such as random access memory (RAM) 762 and/or cache memory 764. Computer system/server 702 may further include other removable/non-removable, volatile/non-volatile computer system storage media. By way of example only, storage system 766 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 715 by one or more data media interfaces. As will be further depicted and described below, memory 760 may include at least one program product having a set (e.g., at least one) of program modules that are configured to carry out the functions of embodiments of the invention.

Program/utility 768, having a set (at least one) of program modules 769, may be stored in memory 760 by way of example, and not limitation, as well as an operating system, one or more application programs, other program modules, and program data. Each of the operating system, one or more application programs, other program modules, and program data or some combination thereof, may include an implementation of a networking environment. Program modules 769 generally carry out the functions and/or methodologies of embodiments of the invention as described herein.

Computer system/server 702 may also communicate with one or more peripheral devices 740 such as a keyboard, a pointing device, a display 730, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 720. Still yet, computer system/server 702 can communicate with one or more networks such as a local area network (LAN), a general wide area network (WAN), and/or a public network (e.g., the Internet) via network adapter 750. As depicted, network adapter 750 communicates with the other components of computer system/server 702 via bus 715. It should be understood that although not shown, other hardware and/or software components could be used in conjunction with computer system/server 702. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electronic signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object orientated program language such as Smalltalk, C++, or the like, and procedural programming languages, such as the "C" programming language or similar programming languages. The computer readable program instructions may execute entirely one the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:

identifying a sending computer system and a receiving computer system, wherein the sending computer system is a potential sender of at least one electronic message during a first time period and wherein the receiving computer system is a potential recipient of the at least one electronic message during the first time period;

receiving a request from the sending computer system for a receptiveness value of the receiving computer system, wherein the receptiveness value indicates openness of the receiving computer system to interruption;

determining a current state of the receiving computer system, wherein the current state is a state of activity of one or more external devices in a geographic area of the receiving computer system during the first time period;

determining a known state of the receiving computer system, wherein the known state is the state of activity of the one or more external devices in the geographic area of the receiving computer system during a second time period, wherein the second time period precedes the first time period;

calculating a known state receptiveness value, wherein the known state receptiveness value indicates the openness of the receiving computer system to interruption at the known state, and, wherein calculating the known state receptiveness value comprises:

identifying at least one second time period electronic message received by the receiving computer system during the second time period;

identifying message metadata for the at least one second time period electronic message;

calculating a response time to the at least one second time period electronic message, wherein the response time is an elapsed time between a time the receiving computer system received the at least one second time period electronic message and a time the receiving computer system sent a response to the at least one second time period electronic message;

in response to calculating the response time, generating correlation transaction sets and correlation probabilities, wherein each of the correlating transaction sets is a data set of the one or more external devices, the activity states, and the response time, and wherein each of the correlation probabilities is a probability of the one or more external devices and the activity states correlating with the response time based on the correlation transaction sets; and calculating the known state receptiveness value using the correlation transaction sets and the correlation probabilities;

analyzing the current state and the known state to determine whether the current state is equivalent to the known state, wherein analyzing the current state and the known state comprises comparing the current state to the known state;

in response to analyzing the current state and the known state, calculating the receptiveness value for the receiving computer system; and transmitting computer instructions for displaying the receptiveness value to the sending computer system.

2. The method of claim 1, wherein determining the current state comprises:
locating the one or more external devices in the geographic area of the receiving computer system during the first time period;
identifying activity states of the one or more external devices during the first time period; and
analyzing the activity states of the one or more external devices during the first time period, resulting in the current state.

3. The method of claim 1, wherein determining the known state comprises:
locating the one or more external devices in the geographic area of the receiving computer system during the second time period;
identifying activity states of the one or more external devices during the second time period; and
analyzing the activity states of the one or more external devices during the second time period.

4. The method of claim 1, wherein calculating the receptiveness value comprises, in response to determining that the current state is unequal to the known state, calculating the receptiveness value via an automated statistical technique.

5. The method of claim 1, wherein calculating the receptiveness value comprises, in response to determining that the current state is equivalent to the known state, determining the receptiveness value for the receiving computer system is equivalent to the calculated known state receptiveness value.

6. The method of claim 1, wherein at least the identifying, the receiving, the analyzing, the calculating, and the transmitting are performed by the receiving computer system.

7. The method of claim 1, wherein at least the identifying, the receiving, the analyzing, the calculating, and the transmitting are performed by a computer system of a trusted third party.

8. A system comprising:
a memory; and
a processor in communication with the memory, the processor configured to perform a method comprising:
identifying a sending computer system and a receiving computer system, wherein the sending computer system is a potential sender of at least one electronic message during a first time period and wherein the receiving computer system is a potential recipient of the at least one electronic message during the first time period;
receiving a request from the sending computer system for a receptiveness value of the receiving computer system, wherein the receptiveness value indicates openness of the receiving computer system to interruption;
determining a current state of the receiving computer system, wherein the current state is a state of activity of one or more external devices in a geographic area of the receiving computer system during the first time period;
determining a known state of the receiving computer system, wherein the known state is the state of activity of the one or more external devices in the geographic area of the receiving computer system during a second time period, wherein the second time period precedes the first time period;
calculating a known state receptiveness value, wherein the known state receptiveness value indicates the openness of the receiving computer system to interruption at the known state, and, wherein calculating the known state receptiveness value comprises:
identifying at least one second time period electronic message received by the receiving computer system during the second time period;
identifying message metadata for the at least one second time period electronic message;
calculating a response time to the at least one second time period electronic message, wherein the response time is an elapsed time between a time the receiving computer system received the at least one second time period electronic message and a time the receiving computer system sent a response to the at least one second time period electronic message;
in response to calculating the response time, generating correlation transaction sets and correlation probabilities, wherein each of the correlating transaction sets is a data set of the one or more external devices, the activity states, and the response time, and wherein each of the correlation probabilities is a probability of the one or more external devices and the activity states correlating with the response time based on the correlation transaction sets; and
calculating the known state receptiveness value using the correlation transaction sets and the correlation probabilities;
analyzing the current state and the known state to determine whether the current state is equivalent to the known state, wherein analyzing the current state and the known state comprises comparing the current state to the known state;
in response to analyzing the current state and the known state, calculating the receptiveness value for the receiving computer system; and
transmitting computer instructions for displaying the receptiveness value to the sending computer system.

9. The system of claim 8, wherein determining the current state comprises:
locating the one or more external devices in the geographic area of the receiving computer system during the first time period;
identifying activity states of the one or more external devices during the first time period; and
analyzing the activity states of the one or more external devices during the first time period, resulting in the current state.

10. The system of claim 8, wherein determining the known state comprises:
locating the one or more external devices in the geographic area of the receiving computer system during the second time period;
identifying activity states of the one or more external devices during the second time period; and
analyzing the activity states of the one or more external devices during the second time period.

11. The system of claim 8, wherein at least the identifying, the receiving, the analyzing, the calculating, and the transmitting are performed by the receiving computer system.

12. The system of claim 8, wherein at least the identifying, the receiving, the analyzing, the calculating, and the transmitting are performed by a computer system of a trusted third party.

13. A computer program product comprising a computer readable storage medium having program instructions embodied therewith, the program instructions executable by a processor to cause the processor to perform a method comprising:

identifying a sending computer system and a receiving computer system, wherein the sending computer system is a potential sender of at least one electronic message during a first time period and wherein the receiving computer system is a potential recipient of the at least one electronic message during the first time period;

receiving a request from the sending computer system for a receptiveness value of the receiving computer system, wherein the receptiveness value indicates openness of the receiving computer system to interruption;

determining a current state of the receiving computer system, wherein the current state is a state of activity of one or more external devices in a geographic area of the receiving computer system during the first time period;

determining a known state of the receiving computer system, wherein the known state is the state of activity of the one or more external devices in the geographic area of the receiving computer system during a second time period, wherein the second time period precedes the first time period;

calculating a known state receptiveness value, wherein the known state receptiveness value indicates the openness of the receiving computer system to interruption at the known state, and, wherein calculating the known state receptiveness value comprises:

identifying at least one second time period electronic message received by the receiving computer system during the second time period;

identifying message metadata for the at least one second time period electronic message;

calculating a response time to the at least one second time period electronic message, wherein the response time is an elapsed time between a time the receiving computer system received the at least one second time period electronic message and a time the receiving computer system sent a response to the at least one second time period electronic message;

in response to calculating the response time, generating correlation transaction sets and correlation probabilities, wherein each of the correlating transaction sets is a data set of the one or more external devices, the activity states, and the response time, and wherein each of the correlation probabilities is a probability of the one or more external devices and the activity states correlating with the response time based on the correlation transaction sets; and calculating the known state receptiveness value using the correlation transaction sets and the correlation probabilities;

analyzing the current state and the known state to determine whether the current state is equivalent to the known state wherein analyzing the current state and the known state comprises comparing the current state to the known state;

in response to analyzing the current state and the known state, calculating the receptiveness value for the receiving computer system; and transmitting computer instructions for displaying the receptiveness value to the sending computer system.

14. The computer program product of claim 13, wherein determining the known state comprises:

locating the one or more external devices in the geographic area of the receiving computer system during the second time period;

identifying activity states of the one or more external devices during the second time period; and analyzing the activity states of the one or more external devices during the second time period.

* * * * *